March 31, 1931.   F. B. BELL ET AL   1,798,301
PROCESS FOR MAKING RINGS FOR SPRINGS
Filed May 15, 1926   9 Sheets-Sheet 3
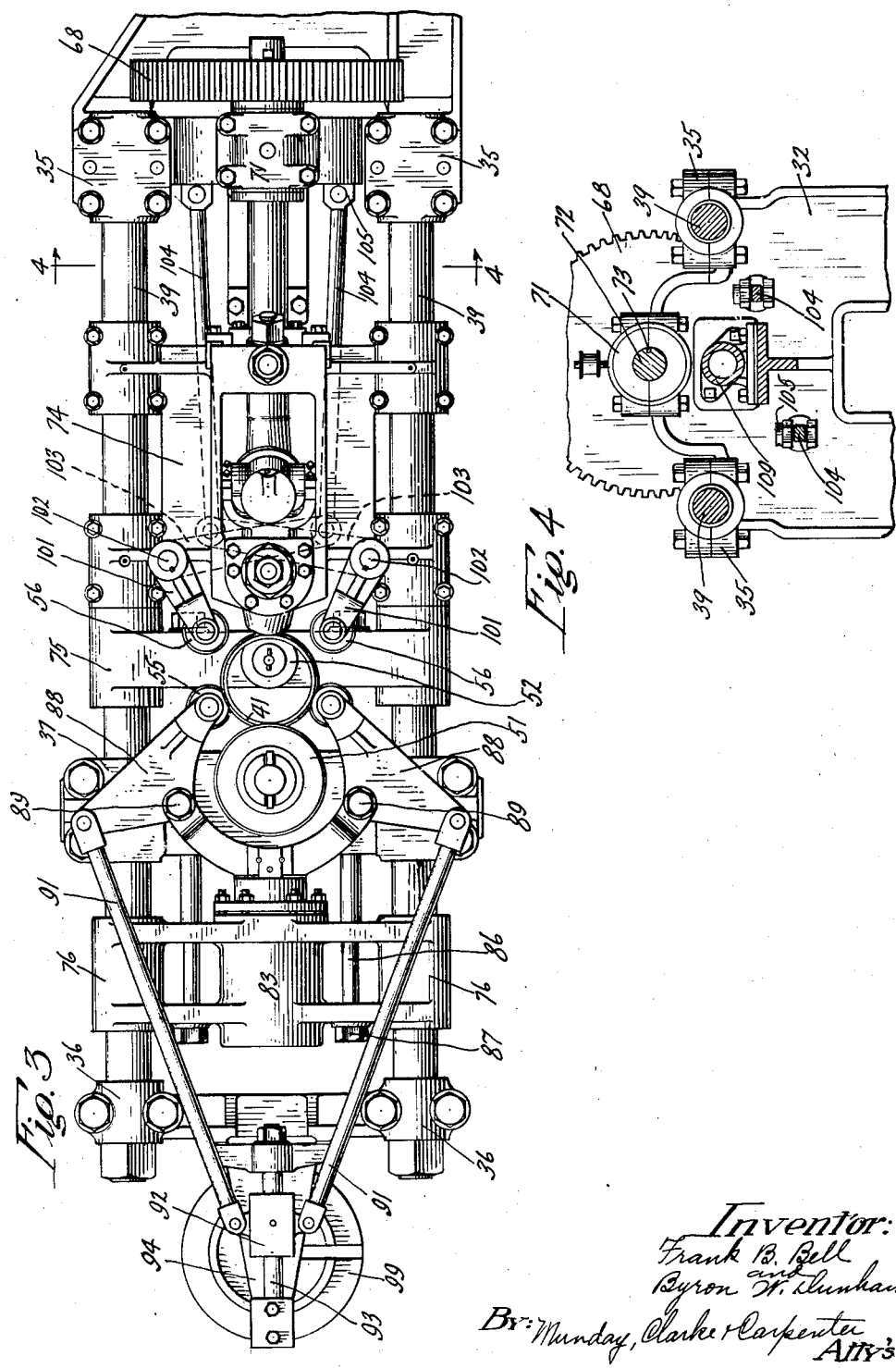
Inventor:
Frank B. Bell
Byron W. Dunham
By: Munday, Clarke & Carpenter
Attys

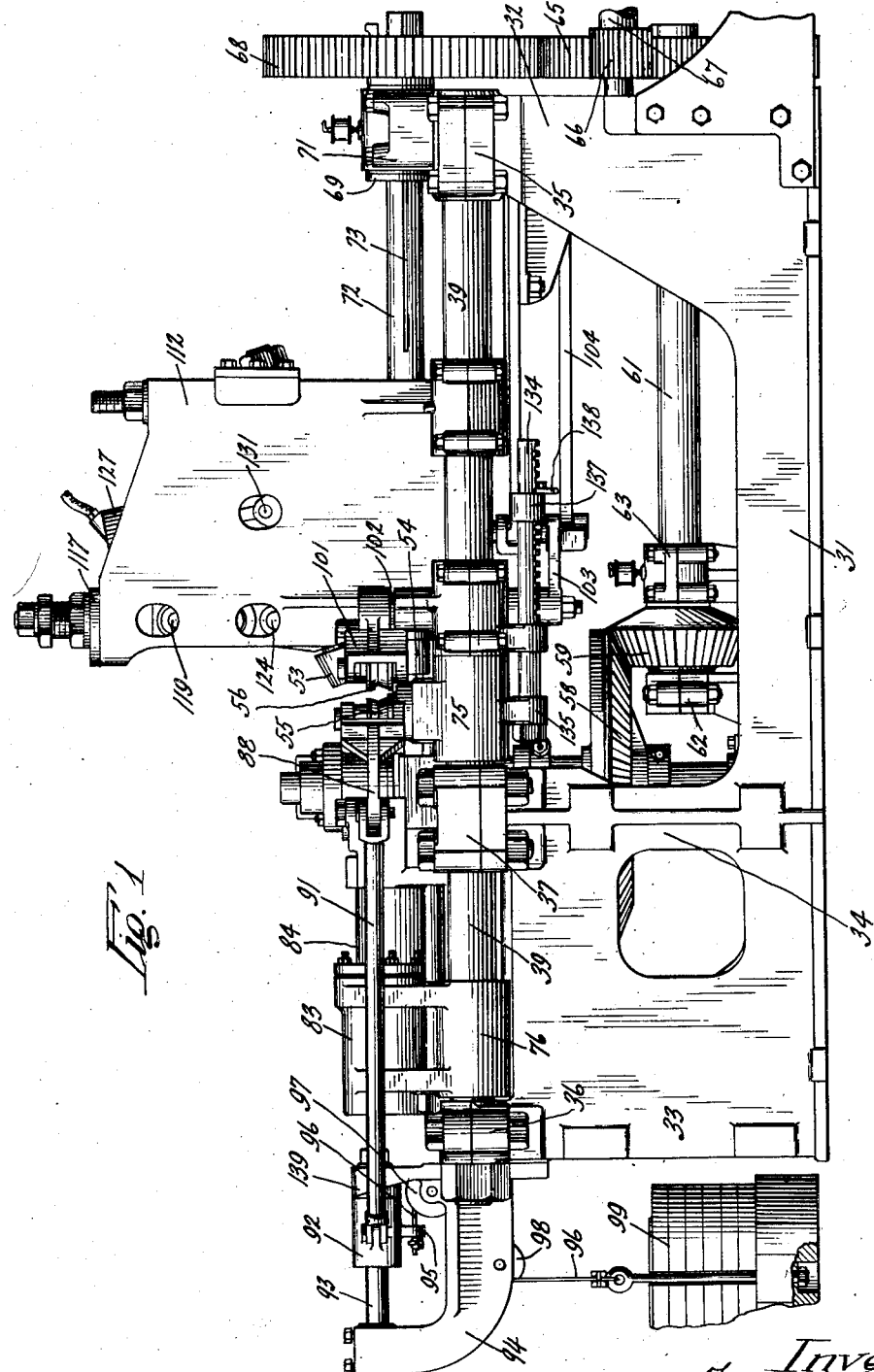

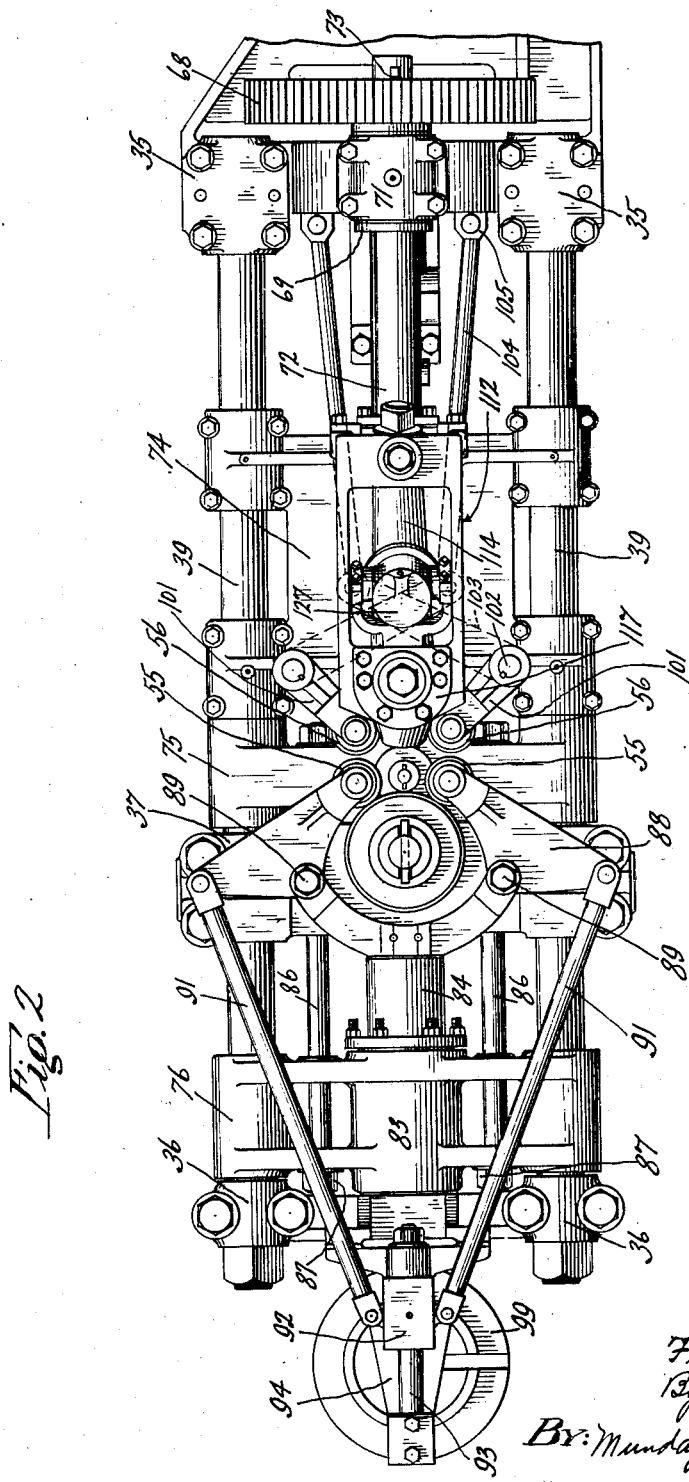

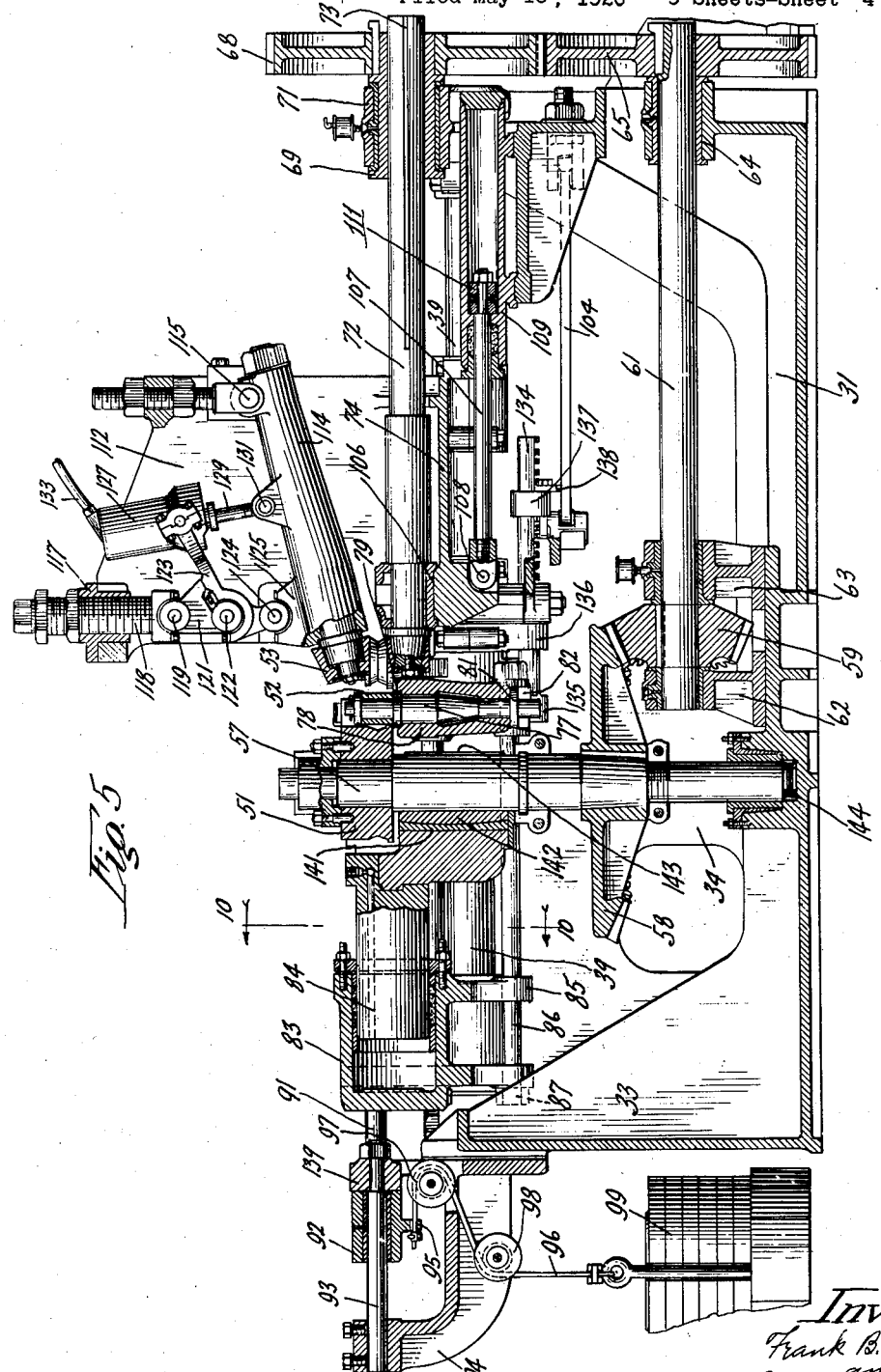

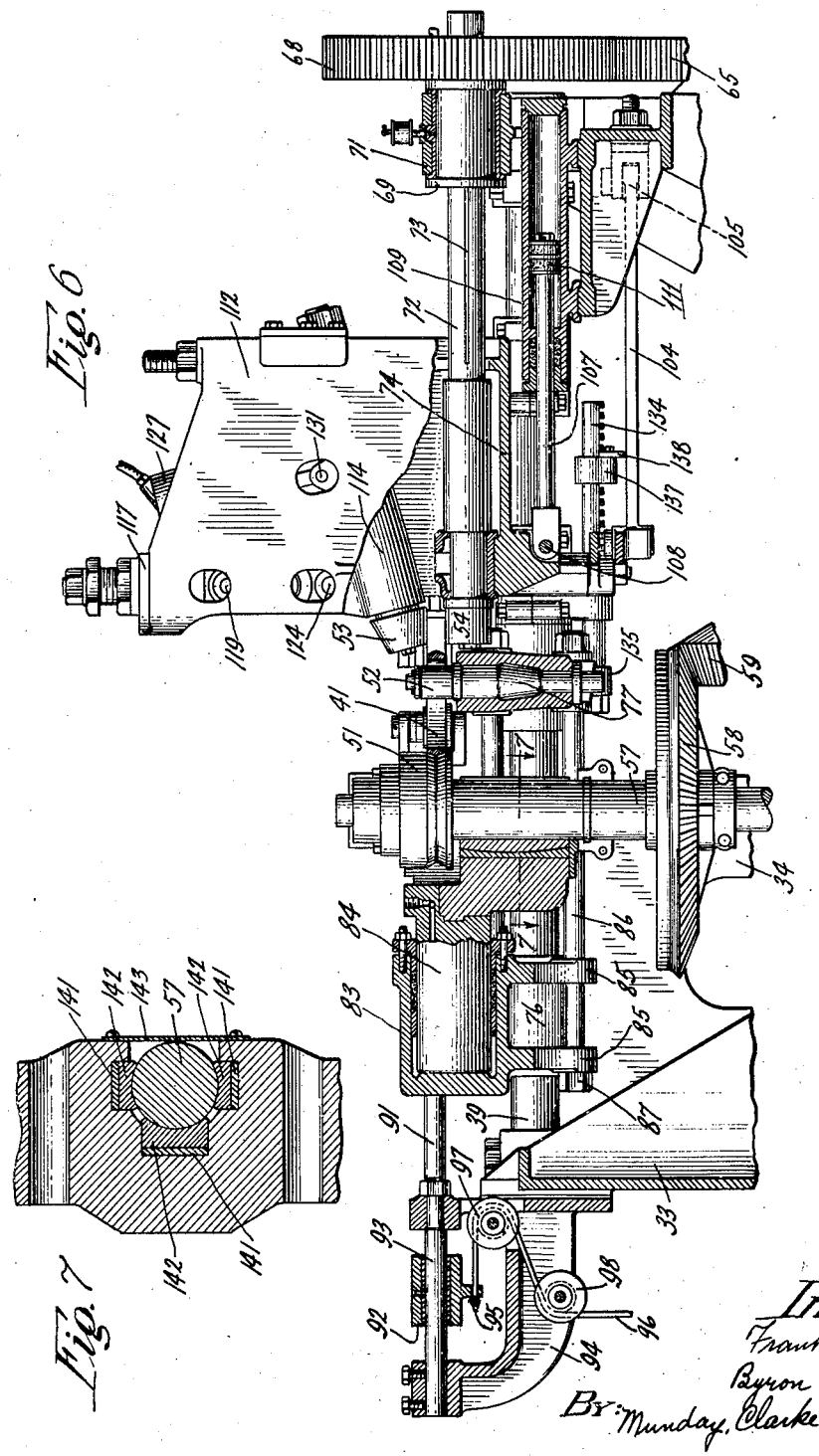

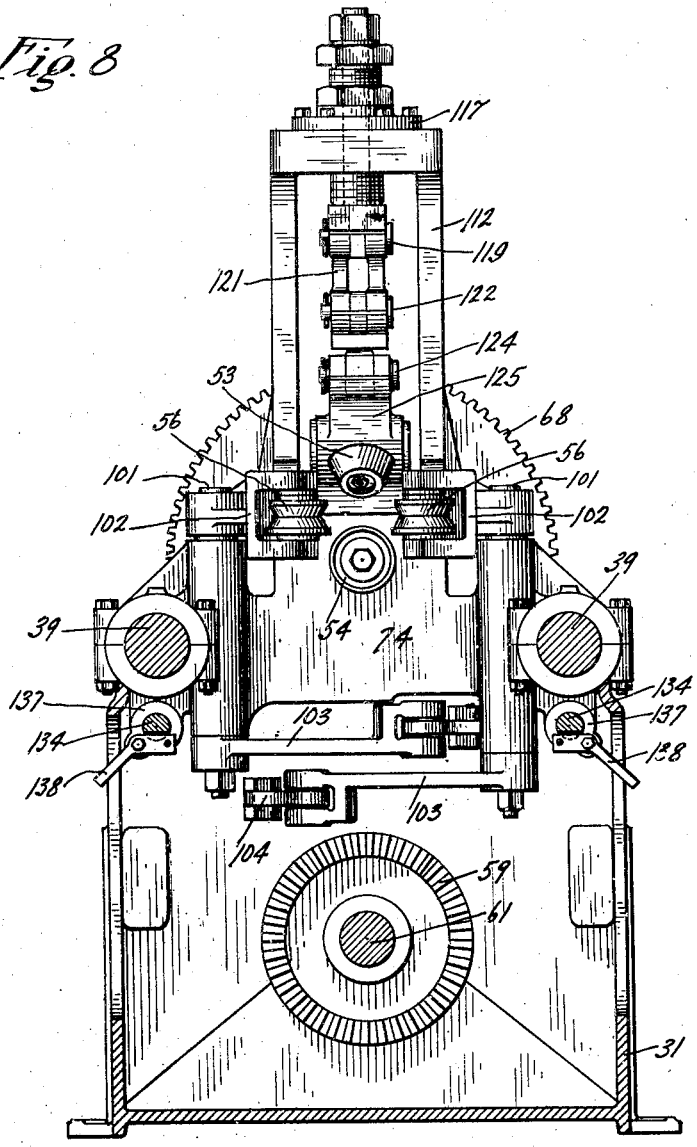

March 31, 1931.   F. B. BELL ET AL   1,798,301
PROCESS FOR MAKING RINGS FOR SPRINGS
Filed May 15, 1926   9 Sheets-Sheet 7
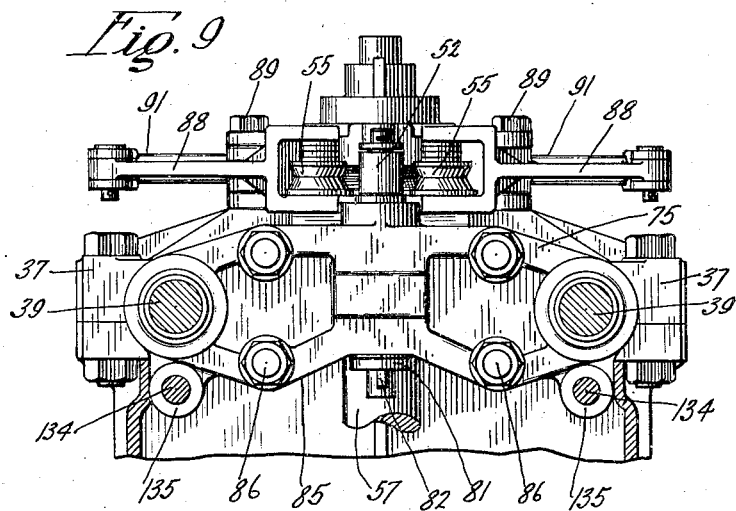
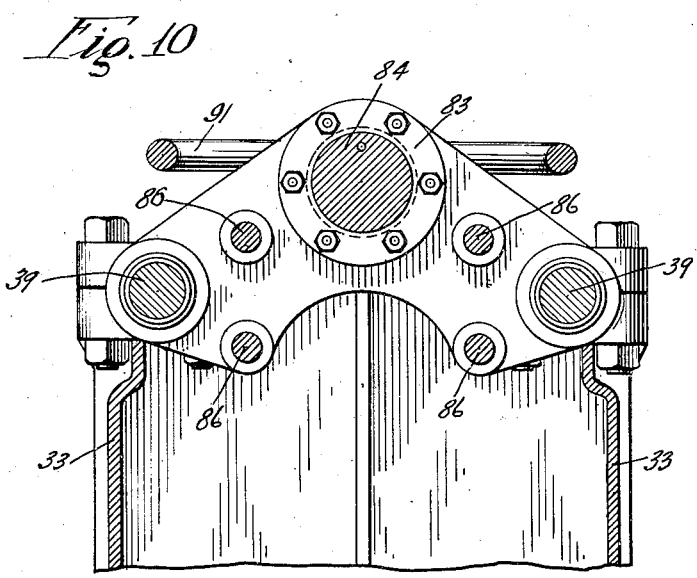
Inventor
Frank B. Bell
Byron W. Dunham
By Munday, Clarke & Carpenter
Atty's

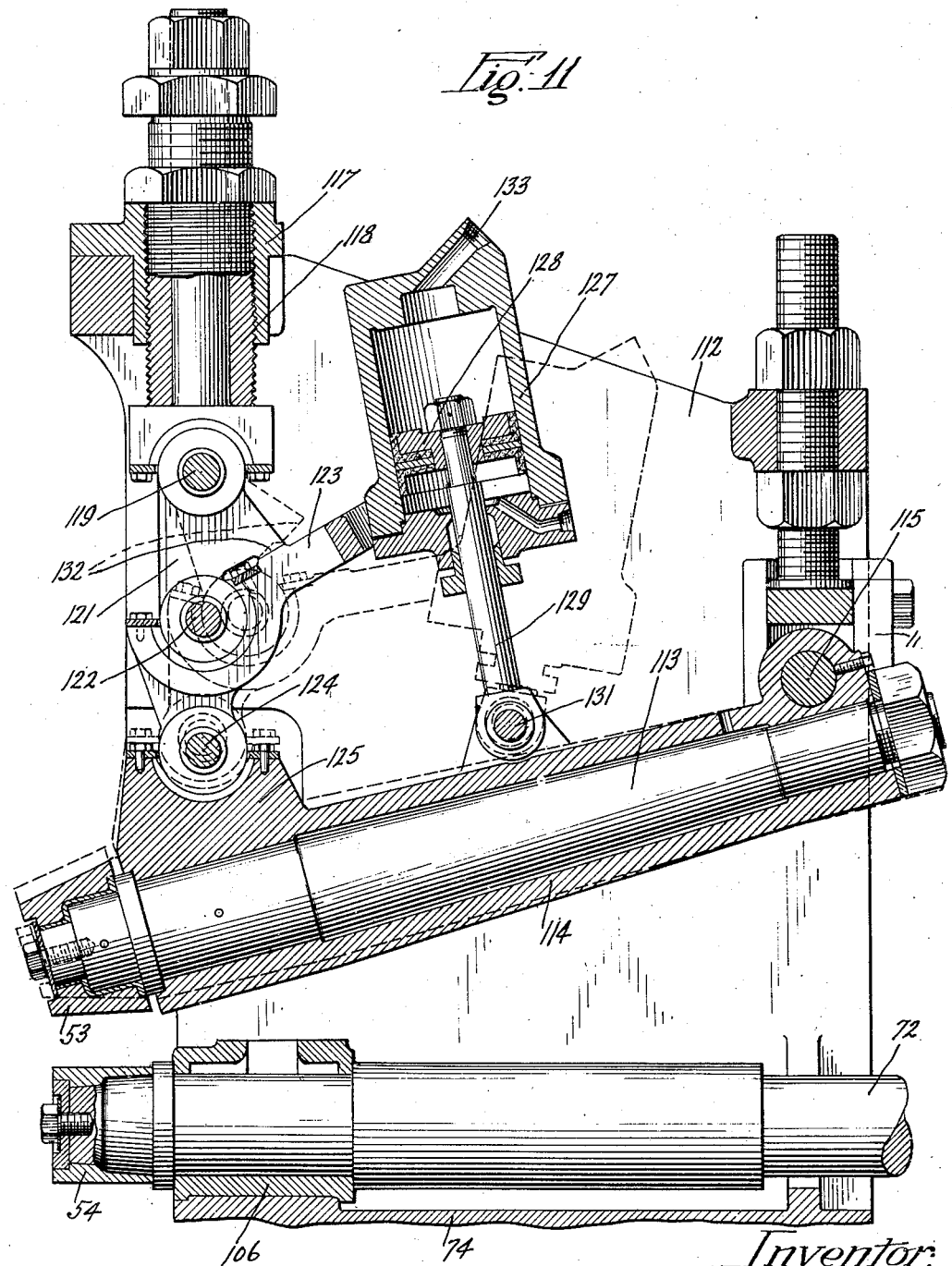

March 31, 1931.  F. B. BELL ET AL  1,798,301
PROCESS FOR MAKING RINGS FOR SPRINGS
Filed May 15, 1926    9 Sheets-Sheet 9

Inventor:
Frank B. Bell
Byron W. Dunham
By: Munday, Clarke & Carpenter
Attys:

Patented Mar. 31, 1931                                                    1,798,301

UNITED STATES PATENT OFFICE

FRANK B. BELL, OF PITTSBURGH, AND BYRON W. DUNHAM, OF OAKMONT, PENNSYLVANIA, ASSIGNORS TO EDGEWATER STEEL COMPANY, OF PITTSBURGH, PENNSYLVANIA, A CORPORATION OF PENNSYLVANIA

PROCESS FOR MAKING RINGS FOR SPRINGS

Application filed May 15, 1926. Serial No. 109,254.

This invention relates in general to the rolling of hollow annulus or rings, and, while from certain standpoints it is more particularly related to the making of rings for springs wherein the spring action is accomplished through the stretching of the metal itself through enlarging and compressing solid rings, it will be readily manifest that the invention in the matter of other features is of wider and more general application.

The form of spring mentioned above consists essentially of two series of alternately arranged larger and smaller rings having interengaging tapered or wedge faces so that when pressure is applied at the end of the spring the faces slide on each other in wedging action stretching the outer rings and compressing the inner rings.

A principal object of the invention is the provision of a new and improved process for making such rings and also the creation of an apparatus for the making of rings through the practice of such process.

Another important object of the invention is the provision of an apparatus of this general character which will be of simple, certain operation, require a minimum number of actuating devices, and which will insure by its construction a minimum of adjustment and certainty of accurate operation.

Numerous other objects and advantages of the invention will be apparent as it is better understood from the following description, which, taken in connection with the accompanying drawings, discloses a preferred embodiment thereof.

Referring to the drawings

Figure 1 is a side elevation of the apparatus embodying the present invention;

Fig. 2 is a top plan view thereof with the parts arranged in rolling relation;

Fig. 3 is a similar view with the parts arranged to deliver a rolled ring;

Fig. 4 is a section taken substantailly on the line 4—4 of Fig. 3;

Fig. 5 is a vertical longitudinal section taken substantially through the center of the machine from end to end;

Fig. 6 is a partial section taken similarly and showing the parts in different relation;

Fig. 7 is a section taken substantially on the line 7—7 of Fig. 6;

Fig. 8 is a vertical transverse sectional view taken substantially through the zone of operation;

Fig. 9 is a partial view taken similarly to Fig. 8 and looking in the opposite direction;

Fig. 10 is a section taken substantially on the line 10—10 of Fig. 5;

Fig. 11 is an enlarged detail section showing a method of roll control to be later described;

Figure 12:
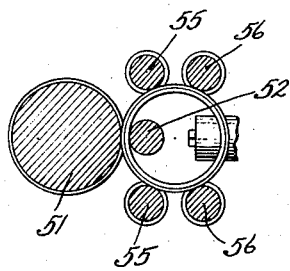
Figs. 12 and 13 are horizontal sectional details showing schematically the arrangement of the apparatus for the rolling of both the internal and external rings respectively.

For the purpose of illustrating the invention we have shown on the drawing an apparatus for the practice of the process and in which certain features of invention forming the subject matter of apparatus claims as embodied. This comprises a single or unit frame 31, which is or may be of a single solid casting and which provides upwardly extending end supports 32 and 33 and a central part 34, all of boxlike structure. Side bearings 35 are provided at one end of the base and side bearings 36 at the other end. A center bearing member 37 is provided across the top of the base and two side or guide members 39 are fixed in bearings 35 and 36 and also in the bearing member 37. A member 39 is arranged at each side and each is preferably of a heavy round rod or bar.

Figure 17:
Fig. 17 is a view of one of the blanks adapted to be formed into a ring of said spring.

In accordance with the invention it is intended that a bloom like that shown in Fig. 17 be first provided. This bloom is thicker and heavier in cross-section than is desired in the finished ring and is correspondingly less in overall diameter.

Figure 16:
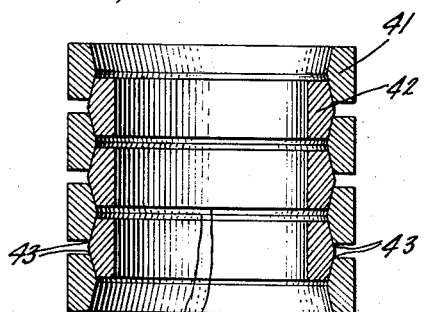
Fig. 16 is a sectional view of a ring spring adapted to be manufactured by the process and apparatus forming the subject matter of this invention.

Viewing Fig. 16 it will be noted that the spring, to the manufacture of which this apparatus is particularly adapted, comprises external rings 41 and internal rings 42 alternately arranged to form inner and outer series. The rings of the inner series 42 are provided with two external bevelled faces 43 and the external rings with two internal bevelled faces 44, the faces of the outer rings matching and mating with those of the inner in wedge relation. The apparatus of this application is adapted to convert blooms, such as those shown at 40 in Fig. 17, into the finished rings 41 and 42, the rings of one series being produced by a set of rolls readily substituted in part for rolls producing rings of the other series.

These rolls comprise a fixed roll 51, a pressure or follower roll 52, upper and lower edging rolls 53 and 54, front guide rolls 55 and rear guide rolls 56.

The fixed roll 51 is secured upon the upper end of a vertical shaft 57 which carries a bevel gear 58 in turn meshing with a bevel pinion 59 upon a horizontal shaft 61. The shaft 61 has bearings at 62, 63 and 64 in the lower part of the base and in turn is provided with a gear 65 upon its end beyond the base. This gear 65, driven from any suitable source of power, meshes with a pinion 66 on a power shaft 67 (Fig. 1). The gear 65 meshes with a gear 68 fast on a sleeve 69 in a central bearing 71 at the end of the frame.

A shaft 72 extends through the sleeve 69 and is secured against independent rotation by a key and groove indicated at 73. The roll 54 is mounted on the end of the shaft 72 so that this roll also is positively driven.

It will be understood that as the rolling progresses the ring member increases in diameter and reduces in section. Relative movement between all the rolls is therefore continually required. To this end three carriages 74, 75 and 76 are mounted upon the guide members or bars 39, already described. The pressure roll 52, which cooperates with the fixed roll 51, is carried in the central carriage 75 and is arranged rotatably upon the upper end of an idler shaft 77 in a bearing 78. This shaft is provided with an enlarged integral collar 79 resting on the top of the bearing and is held at the bottom by a collar 81 threaded over the lower end of the shaft and held in place by a wedge key 82.

In the rolling operation the opening at the center of the bloom is sufficient to permit it to be threaded over the pressure roll 52 whereupon the pressure roll is moved to the left, viewing the drawings, to force the bloom into contact with the fixed roll and enlarge the diameter thereof. This movement and pressure of the pressure roll is accomplished by a moving cylinder 83 fixed in the carriage 76 and adapted to be thrust toward the left when fluid pressure is admitted by the pressure of the medium upon a fixed piston 84, provided on the central bearing member 37. Ears 85 extend down beneath the carriage 76 and two rods 86 extend through these ears and through the carriage 75 being fixed so that the nuts 87 on the end of these rods cause the pressure roll to move to the left with the carriage 76.

The front guide rolls 55 are two in number and each is arranged at the end of a swinging plate 88 pivoted at 89 on the crossmember 37. The swinging plates or levers 88 are connected by rods 91 with a supplemental carriage 92 fixed for back and forth movement upon a shaft or guide 93 fixed at its ends in a bracket 94.

Viewing Fig. 1 it will be noted that the carriage or slide 92 is provided with a downwardly extending ear 95 in which is secured a cable 96 extending forwardly over a sleeve 97 and then back and over a second sleeve 98, both said sleeves being mounted in the bracket 94. Weights 99 are supported on the end of the cable 96 so that these weights, through the mechanism just described, press the rolls 55 against the outer sides of the work adjacent the fixed and pressure rolls, which pressure may be varied by variation in the weights 99.

The upper and lower edging rolls 53 and 54 and the back guide rolls 56 are all carried by and move with the carriage 74. The two guide rolls 56 are adapted to move laterally outwardly as the rolling progresses and the pressure rolls are adapted for relative retreat. Each guide roll 56 is mounted in a bifurcated arm 101 fixed on the end of a short shaft 102 in the carriage 74. The lower end of this shaft is provided with a fixed arm 103 so that each roll 56 may be said to be carried by a bell crank composed of the two arms 101 and 103 and connected and fulcrumed at and by the shaft 102. Each arm 103 is connected by a link 104 with an ear 105 at the end of the frame so that as the carriage 74 moves toward the right, viewing Figs. 1 and 3, the guiding rolls are automatically swung outwardly in the exactly corresponding amount as determined by the bell crank leverage.

As has been described, the edging roll 54 is upon the end of shaft 72. This shaft has bearing at 106 in the carriage 74, the portion of the shaft extending through this bearing being reduced as shown in Fig. 5 so that the shaft is compelled to move axially with the carriage, this being permitted at the bearing 69 by the length of the keyway 73.

The carriage 74 itself is moved positively in both directions by a piston rod 107 connected at 108 beneath the carriage and extending into a cylinder 109 where it is connected with a double acting piston 111.

The upper edging roll 53 is caused to move toward the edging roll 54 as the rolling progresses, the construction and the operation in this action being best disclosed perhaps in Fig. 11. A carriage extension 112 extends up from the carriage 74 and is provided with suitable cross members for bearing purposes. The roll 53 is mounted upon the end of an idler shaft 113 carried in a movable elongated bearing 114. At one end this bearing has a fixed pivot at 115 in an adjustable slide 116. A cross-member 117 is provided at the top and on the side adjacent the main roll in the carriage extension 112 and this carries a vertical adjustable bearing suspension member 118 in which is fixed a pivot or pin 119. Two plates 121 are pivoted on the pin 119 to depend therebeneath and these plates in turn carry a pivot pin 122.

A lever member 123 is pivoted on pin 122 and also on a pin 124 journaled in a head 125 of shaft casing 114. The lever 123 is bifurcated at its other end and is pivotally connected to a fluid pressure cylinder 127. The piston 128 of this cylinder is connected by a piston rod 129 to a pivot 131 arranged on the upper side of the shaft casing 114. The plates 121 and the lever member 123 together form a toggle which is adapted for actuation to swing the shaft 113 from the dotted line position shown in Fig. 11 to the full line operative position as the rolling progresses and through the introduction of fluid under pressure into the cylinder 127. Shoulders 132 are provided on the plates 121 to engage the lever member 123 when the rolls 53 and 54 have brought the spring ring to desired width.

It will be apparent that the adjustment of the screw 118 can be accomplished to determine the final height or width of the ring and that this may be varied as ring specifications may require. The rolling is accomplished, as has been stated, by inserting the bloom over the pressure roll and moving the carriages 74, 75 and 76 into starting position. Thereafter through the control of the three pressure cylinders mentioned the rolling progresses until the finished form is attained, the carriage 75 moving toward the left together with the carriage 76 and the carriage 74 moving toward the right.

Means are provided for separating the rolls to withdraw the finished ring, which will now be described. The top edging roll is lifted by the fluid pressure cylinder 127, the medium being introduced through the upper port 133. This separates the two edging rolls 53 and 54. Thereupon the edging roll carriage 74 is moved to the right, viewing the figures, through the pressure cylinder 109 and piston or connecting rod 107. The movement of the carriage 74 separates the guide rolls 56 as will be readily understood because of the link connections 104 between the frame and the arms 103, already described. The pressure roll carriage is moved to inoperative position through the action of the edging roll carriage by a mechanism to be now described.

Two rods 134 extend from ears 135 beneath the pressure roll carriage and through bearings 136 beneath the edging roll carriage. These rods are notched as may be seen from the drawings and a sliding collar 137 is mounted on each rod, which collar carries a pawl or latch member 138 adapted to engage in the notches of the rod. When the edging roll carriage is moved back, as earlier described, the bearings 136 engage the collar and move the pressure roll away from the fixed or main roll, separating the parts to permit withdrawal of the ring and the insertion of a new bloom. The finished ring may be removed, after the pressure roll carriage and the edging roll carriage have thus been moved, by merely lifting it out from between the front guide rolls, these rolls facilitating this movement since they engage on the same side of a transverse diameter. Upon removal of the ring the weight pulls the weight carriage 92 over against a stop 139 of the bracket 94 in position to engage the next bloom at or shortly after the commencement of the rolling operation.

Main roll shaft 57 is positioned in a spherical or partially spherical bearing. Three fixed blocks 141 (Figs. 6 and 7) are arranged in the cross member 31 of the frame and these are engaged by companion blocks 142 engaging the shaft 57. The contacting surfaces between each pair of blocks 141 and 142 are curved vertically on the arc of a large circle as shown. A plate 143 extends across the shaft on the side adjacent the pressure roll. At the bottom the shaft is provided with a ball thrust bearing 144. The pressure of the moving cylinder 83, which forces the pressure roll against the inner face of the bloom and which in cooperation with the main roll 51 reduces the thickness and enlarges the diameter of the bloom, is accomplished, as will be noted, through the rods 86 which pull the carriage 75 to the left, viewing Fig. 2, resistance being offered through the fixed piston 84, which is connected with, and in a sense forms a part of, the fixed cross member 37. It will be readily apparent that the thrust of this connection is taken up within, what may be termed, a self-contained unit and is borne by the rods 86 in tension, and the piston 84 in compression.

It will be manifest also that the rear pressure rolls 56 transmit force through the ring itself to the main roll 51 and through this main roll to the fixed cross member 37 mounted on the rods 39 and through these rods in tension to the solid frame end 35; and that the pressure on the ring and the tension of the rods or guides 39 decreases progressively as the ring enlarges and the rolls 58 separate. The rods 39 consequently function as tension members for sustaining the pressure of the rolls 56 and as guide members for the various moving carriages already described.

Figure 13:
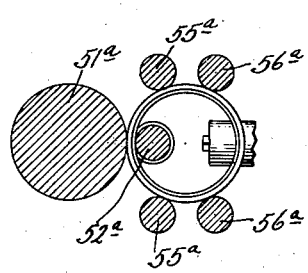
Figure 14:
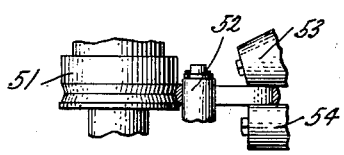
Figs. 14 and 15 are schematic vertical views of the same.
Figure 15:
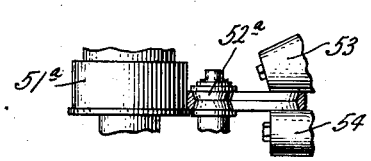

The rolls shown on the drawing are the rolls for rolling the inner rings 42 of the spring shown in Fig. 16. The outer rings may readily be rolled on the same machine by merely substituting rolls. This is illustrated in Figs. 12 to 15, Figs. 12 and 14 being a schematic showing of the rolls as illustrated on the other views of the drawings and for rolling the inner rings and Figs. 13 and 15 illustrating rolls for rolling the outer ring. Viewing Figs. 12 and 14 it will be noted that in rolling the inner ring the main roll 51 and guide rolls 55 and 56 have recessed or grooved faces while the pressure roll 52 has a plain face. To roll the outer ring main roll 51$^a$ and guide rolls 55$^a$ and 56$^a$ are provided with plain faces and pressure roll 52$^a$ with a grooved face.

It is thought that the invention and many of its attendant advantages will be understood from the foregoing without further description, and it will be manifest that the process selected in connection with the description of the preferred embodiment may be departed from in various ways without departing from the spirit and scope of the invention.

We claim:

1. In a rolling mill for rolling rings for springs and having beveled or wedge engaging faces, the combination of, a plurality of roll holders, a forming roll mounted in said holders and adapted to form the wedge or cone face on the ring and engage an additional surface thereof to roll the ring by a wedging action, a pressure roll engaging a face of the ring opposite to said forming roll, said pressure and forming rolls being interchangeable whereby the cone face may be formed on either the inner or outer circumferential surface of said ring.

2. In a rolling mill for rolling rings for springs having bevelled or wedge engaging faces, the combination of, a frame, a movable roll holder mounted in said frame, a roll mounted in said holder and adapted to engage the surface of a ring blank to form the operative tapered or wedge face of the ring and having parts engaging an adjacent surface of the ring during the rolling to aid in holding said roll to said working face of said ring, said roll being adapted to change its position in the frame during the rolling process.

3. In a rolling mill for rolling rings for springs and the like, the combination of, a main roll carriage, a pressure roll carriage, slide-way members extending past said rolls and members transmitting to said slide-way members the thrust of the rolls in rolling action.

4. In a rolling mill for rolling rings for springs and the like, the combination of, roll holders, rods extending past said roll holders, carriages mounted on said rods for moving the rolls in action, and means transmitting the thrust of the carriages to said rods.

5. In a rolling mill for rolling rings for springs and the like, the combination of, a main frame, a stationary roll fixed in said main frame, a pressure roll carriage slidably mounted in said main frame, and a side forming roll carriage slidably mounted in said main frame.

6. In a rolling mill for rolling rings for springs and the like, the combination of, a main frame, a stationary roll fixed in said main frame, a pressure roll carriage mounted in said main frame, and a side forming roll carriage mounted in said main frame, said main frame having thrust bars for taking up the thrust of all the rolling actions.

7. In a rolling mill for rolling rings for springs and the like, the combination of, a single unit frame, a fixed face forming roll mounted in said main frame, a pressure roll cooperating with the fixed forming roll for determining the thickness of the rings, a movable carriage carrying said pressure roll, a pair of edging rolls, one of which is movable toward and from the plane of the ring, a carriage in which said width forming rolls are mounted, guide rolls carried by said carriage, and means mounted in said frame for guiding said carriages in their action.

8. In a rolling mill for rolling rings for springs and the like, the combination of, a single unit frame, a fixed face forming roll mounted in said frame, a pressure roll cooperating with the fixed forming roll for determining the thickness of the rings, a movable carriage carrying said pressure roll, a pair of edging rolls, one of which is movable toward and from the plane of the ring, a carriage in which said width forming rolls are mounted, guide rolls carried by said carriage, and common guide members in said frame for guiding said carriages.

9. In a rolling mill for rolling rings for springs and the like, the combination of rolls for determining the thickness of the ring and rolls for determining the width of the ring, one at least of which is movable toward and from the plane of the ring, a toggle for moving said roll, and a fluid pressure device for actuating said toggle.

10. In a rolling mill for rolling rings for springs and the like, the combination of, rolls for determining the thickness of the ring and rolls for determining the width of the ring, one at least of which is movable toward and from the plane of the ring, a toggle for moving said roll, and an air cylinder for actuating said toggle.

11. In a rolling mill for rolling rings for springs and the like, the combination of, rolls for determining the thickness of the ring and rolls for determining the width of the ring, one at least of which is movable toward and from the plane of the ring, a toggle for moving said roll, and a fluid pressure device for actuating said toggle, said fluid pressure device having a movement greatly in excess of the movement of the roll in its operation.

12. In a rolling mill for rolling rings for springs and the like, the combination of, thickness determining rolls and edging rolls, one at least of which is movable toward and from the plane of the ring as an incident to the rolling action, a shaft carrying said roll, a toggle for swinging said shaft and moving said roll, means for actuating said toggle, and an adjusting device for determining the movement of the toggle under the action of said moving means.

13. In a rolling mill for rolling rings for springs and the like, the combination of, thickness determining rolls and edging rolls, one of which at least is movable toward and from the ring as an incident to the forming operation, a fluid pressure device for moving said roll, and means independent of said fluid pressure device for adjusting the movement of the roll.

14. In a rolling mill for rolling rings for springs and the like, the combination of, edging rolls for engaging the upper and under faces of the ring being rolled, guide rolls adapted to engage the outer circumference of the ring during the forming thereof, and having a separating movement as the rolling progresses, said edging rolls and said guide rolls being mounted in a common carriage movable itself as the rolling progresses, and means determined by movement of the carriage for moving said rolls laterally as the carriage moves longitudinally.

15. In a rolling mill for rolling rings for springs and the like, the combination of, a main frame, a carriage sliding in said main frame, edging rolls carried by said carriage and adapted for relative approach as the rolling progresses, guide rolls arranged adjacent said edging rolls, and carried by said carriage and movable in separation as the rolling progresses, swinging carriers for said guide rolls and connections between said swinging carriers and said frame to cause lateral movement of the guide rolls as an incident to longitudinal movement of the carriage.

16. In a rolling mill for rolling rings for springs and the like, the combination of, a frame, a pressure roll carriage mounted in said frame, an edging roll carriage mounted in said frame, a fluid cylinder for moving each said carriage in its rolling action, and a connection between said carriages whereby movement of one carriage to inoperative position after rolling action accomplishes movement of another carriage to inoperative position to remove the finished ring and permit insertion of a bloom.

17. In a rolling mill for rolling rings for springs and the like, the combination of, a pair of carriages respectively carrying pressure and edging rolls, said carriages having wholly independent movement during the operation of the rolls, and a conjoint interdependent movement to final inoperative position, and means for adjusting said movement to effect predetermined arrangement of the rolls when in inoperative position.

18. In a rolling mill for rolling rings for springs and the like, the combination of, a fixed main roll, a movable pressure roll for determining the diameter of the ring, guide rolls preserving the rotundity of the ring as it is formed, swinging carriers for said guide rolls, and a gravity device for determining the pressure of said rolls on the ring as the rolling progresses.

19. In a rolling mill for rolling rings for springs and the like, the combination of, a fixed main roll, a movable pressure roll for determining the diameter of the ring, guide rolls preserving the rotundity of the ring as it is formed, swinging carriers for said guide rolls, and an adjustable gravity device for determining the pressure of said rolls on the ring as the rolling progresses.

20. In a rolling mill for rolling rings for springs and the like, the combination of a fixed main roll, a movable pressure roll for determining the diameter of the ring guide rolls for preserving the rotundity of the rings formed, and a device for applying a predetermined pressure to the guide rolls, said device being rendered active by engagement of said rolls with said ring as the rolling progresses.

21. In a rolling mill for rolling rings for springs and the like, the combination of a main frame, a fixed main roll mounted in said frame, guide members arranged lengthwise of the frame, roll carrying carriages supported on said guide members, rolls carried by said carriages and connecting with said main roll to form a ring, and a connection between said main roll and said guide members to transfer the thrust of said rolls to said guide members and through said guide members to said frame.

22. In a rolling mill for rolling rings for springs and the like, the combination of, a main roll, a shaft carrying the same, means for actuating said shaft and roll, and a spherical bearing for said shaft.

23. In a rolling mill for rolling rings for springs and the like, the combination of, a main fixed roll, a shaft carrying the same, means for actuating said shaft, a pressure roll cooperating with said fixed roll, and a spherical seat arranged to engage said shaft on the side opposite said pressure roll.

24. In a rolling mill for rolling rings for springs and the like, the combination of, a pair of cooperating rolls, means for exerting pressure on a said roll in the direction of the other roll, shafts carrying said rolls, and a spherical seat engaging said shaft on the side opposite the companion roll.

25. In a rolling mill for rolling rings for springs and the like, the combination of, a main roll, a shaft carrying the same, a main frame in which said shaft is mounted, a ball thrust bearing arranged to receive downward pressure of the shaft in action, and a clamp about the shaft engaging said main frame adapted to receive pressure on the shaft.

26. In a rolling mill for rolling spring rings and the like the combination of, a forming roll, a pressure roll for moving the ring against the forming roll, guide rolls for preserving the rotundity of the ring as it is formed, swinging carriers for said guide rolls, and means for maintaining a constant pressure on said guide rolls during predetermined movement of the swinging carriers.

27. In a rolling mill for rolling spring rings and the like the combination of, a forming roll, a pressure roll for moving the ring against the forming roll, guide rolls for preserving the rotundity of the ring as it is formed, swinging carriers for said guide rolls, and a constant pressure device for resisting movement of the swinging carrier during a rolling operation.

28. In a rolling mill for rolling spring rings and the like the combination of, a forming roll, a pressure roll for moving the ring against the forming roll, guide rolls for preserving the rotundity of the ring as it is formed, swinging carriers for said guide rolls, and a yieldable device adapted to maintain a constant pressure on said guide rolls during a rolling operation.

29. In a rolling mill for rolling spring rings and the like the combination of, a forming roll, a pressure roll for moving the ring against the forming roll, guide rolls for preserving the rotundity of the ring as it is formed, swinging carriers for said guide rolls, and a yieldable device adapted to maintain a constant pressure on said guide rolls during a rolling operation, said device being adjustable for controlling the pressure.

30. In a rolling mill for rolling rings for springs and the like, the combination of a pair of carriages respectively carrying pressure and rolls, said carriages having wholly independent movement during the operation of the rolls, and a conjoint interdependent movement to final inoperative position.

31. In a rolling mill for rolling rings for springs and the like, the combination of a main frame, a fixed main roll mounted in said frame, guide members arranged lengthwise of the frame, roll carrying carriages supported on said guide members, rolls carried by said carriages and connecting with said main roll to form a ring, and a connection between said main roll and said guide members to transfer the thrust of said rolls to said guide members and through said guide members to said frame in tension.

FRANK B. BELL.
BYRON W. DUNHAM.